No. 834,492. PATENTED OCT. 30, 1906.
G. ROTHENBÜCHER.
CHUCK.
APPLICATION FILED SEPT. 28, 1905.
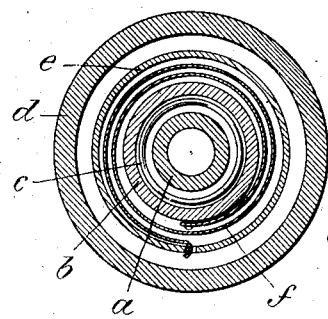
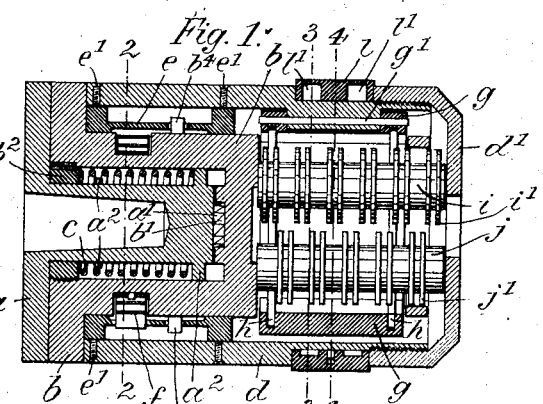
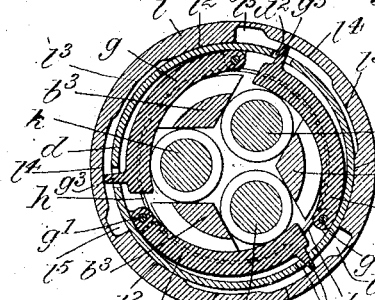
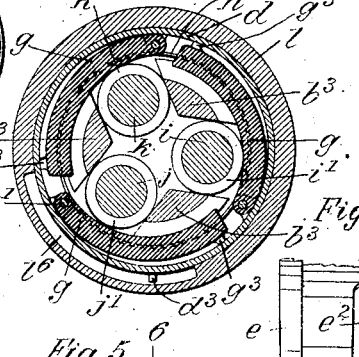
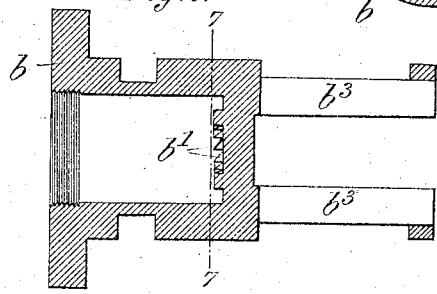
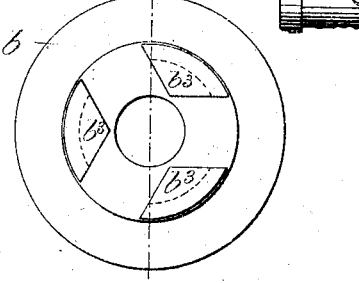
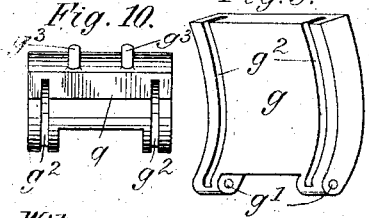
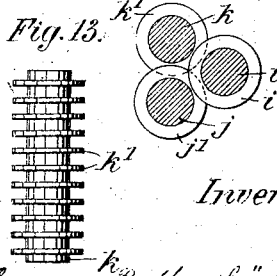
Witnesses:
Arthur Jumps
William Schulz
Inventor:
George Rothenbücher
by Frank V. Briesen Atty

UNITED STATES PATENT OFFICE.

GEORGE ROTHENBÜCHER, OF NEW YORK, N. Y.

CHUCK.

No. 834,492.      Specification of Letters Patent.      Patented Oct. 30, 1906.

Application filed September 28, 1905. Serial No. 280,405.

*To all whom it may concern:*

Be it known that I, GEORGE ROTHENBÜCHER, a citizen of the United States, residing at New York city, Brooklyn, county of Kings, State of New York, have invented new and useful Improvements in Chucks, of which the following is a specification.

This invention relates to a chuck for boring, tapping, and drilling tools, which is so constructed that it may be readily manipulated and that it is adapted to securely grasp tools down to the smallest diameter.

In the accompanying drawings, Figure 1 is a longitudinal section of my improved chuck; Fig. 2, a cross-section on line 2 2, Fig. 1; Fig. 3, a cross-section on line 3 3, Fig. 1; Fig. 4, a cross-section on line 4 4, Fig. 1, showing the parts in a different position; Fig. 5, a front view of the sleeve; Fig. 6, a longitudinal section on line 6 6, Fig. 5; Fig. 7, a cross-section on line 7 7, Fig. 6; Fig. 8, a detail of one of the cam-actuating springs; Fig. 9, a perspective view of one of the cams; Fig. 10, a front view thereof. Figs. 11 to 13 are details of the three coacting chuck-jaws; Fig. 14, a cross-section through the jaws, showing them in their extreme inner position; and Fig. 15, a detail of part of the bushing.

The letter $a$ indicates the socket or holder of the chuck, adapted to receive the spindle, (not shown,) by means of which it is rotated in the usual manner. The socket $a$ is surrounded by a tubular sleeve or body $b$ and imparts motion to the same by intermeshing teeth $a'$ $b'$ of the parts $a$ $b$, respectively. A coiled spring $c$, bearing with one end against a ring $b^2$ of sleeve $b$ and with its other end against a flange $a^2$ of socket $a$, normally holds the teeth $a'$ $b'$ in engagement. The sleeve $b$ is axially movable on socket $a$ and may be drawn forward by means of the shell hereinafter described to disengage teeth $b'$ $a'$. Thus the chuck may be arrested to fit a tool into the same, while the socket $a$ continues to rotate. Stops $a^2$ on socket $a$ limit the longitudinal movement of sleeve $b$.

From sleeve $b$ project forwardly a suitable number of longitudinal ribs $b^3$, Figs. 5 and 6, between which longitudinal slots adapted for the reception of the chuck jaws are formed.

The sleeve $b$ is surrounded by a tubular shell $d$, carrying the perforated cap $d'$. The shell $d$ is rotatable on sleeve $b$ and longitudinally movable therewith, a bushing $e$, secured to shell $d$ by screws $e'$, being interposed between the parts $d$ and $b$. A spiral spring $f$, seated within a circumferential groove of sleeve $b$ and secured at its ends to the parts $e$ and $d$, serves to turn shell $d$, and thereby close the jaws in manner hereinafter described. This rotation of shell $d$ is limited by a pair of pins $b^4$ of sleeve $b$, that engage slots $e^2$ of bushing $e$.

To the inner side of shell $d$ are hinged at $g'$ a series of arched cams or push-pieces $g$, surrounding ribs $b^3$. The cams $g$ are adapted to be pressed outward by a pair of springs $h$, seated within inner circumferential grooves $g^2$ of the cams.

The inner concave surfaces of the cams operatively engage the jaws $i$ $j$ $k$ of the chuck, which are located within the longitudinal slots formed between the ribs $b^3$, Figs. 3 and 4. The jaws are made in the form of cylinders, which are by the cams $g$ forced inwardly against the tool. I prefer to provide the jaws with annular circumferential ribs, which are adapted to overlap and to thus grasp tools of the smallest possible diameter. As shown, the jaw $i$ has ribs $i'$, arranged in spaced pairs, while the jaw $j$ has similarly-arranged ribs $j'$, which are staggered with ribs $i'$. Jaw $k$ has equidistant ribs $k'$, adapted to alternately enter between ribs $i'$, and ribs $j'$. When the jaws are converged to their maximum extent, the ribs $i'$ $j'$ $k'$ will meet at the axis of the chuck, Fig. 14, and therefore tools of the smallest possible diameter may be grasped by such ribs.

Each cam $g$ projects from its fulcrum $g'$ gradually inward, so that by the partial rotation of shell $d$ in one direction the chuck-jaws are crowded inward by such cams. Means are provided for altering this dip of the cams and thereby gaging the chuck for tools of larger or smaller diameters. These means consist of a rotatable ring $l$, embracing sleeve $d$ and held in place by cap $d'$. The ring $l$ is provided at its inner side with a pair of stepped grooves $l'$, the steps $l^2$ $l^3$ $l^4$ of such grooves merging into one another. The steps $l^2$ $l^3$ $l^4$ engage fingers $g^3$, projecting outwardly from the free ends of cams $g$ and passing through openings $d^2$ of shell $d$. Thus by alining the proper steps with fingers $g^3$ the dip of the cams may be adjusted, as will be readily understood. The last or deepest step $l^4$ merges into a pocket $l^5$, which permits the cams to be entirely retracted during the assemblage of the parts. The play of the ring $l$ is determined by a pin $d^3$ on shell $d$, which engages a groove $l^6$ of the ring.

By grasping shell $d$ and drawing it forward cams $g$ will be turned relatively to the chuck-jaws, so as to cause the latter to diverge, Fig. 4, while the chuck is simultaneously uncoupled from the spindle. The tool being inserted, shell $d$ is released, when spring $f$ will return the shell to its normal position, and thereby cause cams $g$ to force the chuck-jaws inward, Fig. 3, and against the tool. At the same time the teeth $a'$ $b'$ will become reëngaged by spring $c$ to recouple the chuck with the spindle.

If desired, the socket $a$ may be omitted and the chuck be mounted directly upon the spindle.

What I claim is—

1. A chuck provided with a shell, inclosed cams, jaws actuated by the cams, and means for adjusting the dip of the cams, substantially as specified.

2. A chuck provided with a shell, inclosed cams, jaws actuated by the cams, and a relatively movable stepped ring adapted to engage the cams, substantially as specified.

3. A chuck provided with a perforated shell, spring-influenced cams hinged thereto, fingers projecting from the cams through the shell perforation, jaws actuated by the cams, and a relatively movable stepped ring adapted to engage the cam-fingers, substantially as specified.

4. A chuck provided with a first cylindrical jaw having annular ribs arranged in spaced pairs, a second cylindrical jaw having similarly-arranged annular ribs, and a third cylindrical jaw having equidistant annular ribs that project between the rib pairs of the first and second jaws, substantially as specified.

5. In a chuck, a holder adapted to be fitted to a machine and having clutch-teeth, combined with a surrounding body having corresponding teeth and longitudinally movable upon the holder to engage or disengage the teeth, jaws radially movable on the body, means for closing the jaws, and a shell rotatable on the body and longitudinally movable therewith, substantially as specified.

Signed by me at New York city, Manhattan, New York, this 27th day of September, 1905.

GEORGE ROTHENBÜCHER.

Witnesses:
    ERIC LÜUR,
    FRANK V. BRIESEN.